US012566944B2

(12) United States Patent
       Cline

(10) Patent No.:     US 12,566,944 B2
(45) Date of Patent:          Mar. 3, 2026

(54) LOW LATENCY INTERRUPT ALERTS FOR ARTIFICIAL NEURAL NETWORK SYSTEMS AND METHODS IN DATA STREAM PROCESSING

(71) Applicant: Lattice Semiconductor Corporation, Portland, OR (US)

(72) Inventor: Ronald L. Cline, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 930 days.

(21) Appl. No.: 16/290,811

(22) Filed: Mar. 1, 2019

(65) Prior Publication Data

US 2019/0279100 A1      Sep. 12, 2019

Related U.S. Application Data

(60) Provisional application No. 62/640,741, filed on Mar. 9, 2018.

(51) Int. Cl.
| | |
|---|---|
| *G06N 20/00* | (2019.01) |
| *G06F 9/38* | (2018.01) |
| *G06F 18/214* | (2023.01) |
| *G06N 3/02* | (2006.01) |
| *G06N 3/048* | (2023.01) |
| *G06N 3/08* | (2023.01) |
| *G06N 5/04* | (2023.01) |

(52) U.S. Cl.
CPC ............. *G06N 3/08* (2013.01); *G06F 9/3877* (2013.01); *G06F 18/214* (2023.01); *G06N 5/04* (2013.01)

(58) Field of Classification Search
CPC .......... G06N 5/04; G06N 3/08; G06F 9/3877; G06F 18/214; G06K 9/6256
See application file for complete search history.

(56) References Cited

U.S. PATENT DOCUMENTS

| | | | |
|---|---|---|---|
| 5,768,476 A | 6/1998 | Sugaya et al. | |
| 8,843,408 B2 * | 9/2014 | Singla .................... | G06Q 40/06 |
| | | | 705/37 |
| 9,507,500 B2 | 11/2016 | Wigdor et al. | |
| 10,650,805 B2 * | 5/2020 | Pinto ....................... | G10L 15/30 |
| 2012/0275690 A1 | 11/2012 | Melvin et al. | |

(Continued)

FOREIGN PATENT DOCUMENTS

| | | |
|---|---|---|
| CN | 104410822 | 3/2015 |
| CN | 106650655 | 5/2017 |

(Continued)

*Primary Examiner* — Brandon S Cole
(74) *Attorney, Agent, or Firm* — Haynes and Boone, LLP

(57) ABSTRACT

Various techniques are provided for providing neural networks with increased efficiency. In one example, a system includes a first artificial neural network (ANN), a second ANN, and a logic device. The first ANN is configured to receive a first plurality of data inputs associated with a data stream and process the first data inputs to generate a first inference output after a first latency. The second ANN is configured to receive a second plurality of data inputs associated with the data stream and process the second data inputs to generate a second inference output after a second latency less than the first latency. The logic device is configured to receive the second inference output before the first inference output is generated. Additional systems and methods are also provided.

20 Claims, 6 Drawing Sheets

(56)        References Cited

U.S. PATENT DOCUMENTS

| | | | |
|---|---|---|---|
| 2013/0318018 A1 | 11/2013 | Kalya et al. | |
| 2014/0101763 A1* | 4/2014 | Harlacher | H04L 63/1458 |
| | | | 711/163 |
| 2015/0019214 A1* | 1/2015 | Wang | G06N 3/02 |
| | | | 704/232 |
| 2016/0058371 A1* | 3/2016 | Singh Alvarado | A61B 5/725 |
| | | | 600/483 |
| 2016/0217387 A1* | 7/2016 | Okanohara | G06N 20/00 |
| 2016/0350650 A1* | 12/2016 | Leeman-Munk | G06N 3/045 |
| 2017/0140259 A1* | 5/2017 | Bergstra | G06N 3/084 |
| 2017/0175172 A1* | 6/2017 | Apte | G16B 50/20 |
| 2017/0178346 A1 | 6/2017 | Ferro et al. | |
| 2017/0206434 A1* | 7/2017 | Nariyambut Murali | |
| | | | G06V 10/454 |
| 2017/0262996 A1 | 9/2017 | Jain et al. | |
| 2017/0272825 A1* | 9/2017 | Patel | H04N 21/4532 |
| 2017/0294186 A1 | 10/2017 | Pinto et al. | |
| 2018/0046901 A1 | 2/2018 | Xie et al. | |
| 2018/0046913 A1 | 2/2018 | Yu et al. | |
| 2018/0089591 A1* | 3/2018 | Zeiler | G06N 3/045 |
| 2018/0108369 A1* | 4/2018 | Gross | G10L 25/30 |
| 2018/0129939 A1 | 5/2018 | Yang | |
| 2018/0157972 A1 | 6/2018 | Hu et al. | |
| 2018/0268287 A1* | 9/2018 | Johansen | G06N 3/048 |
| 2018/0285735 A1 | 10/2018 | Baum et al. | |
| 2019/0361918 A1* | 11/2019 | Rogynskyy | G06F 16/245 |

FOREIGN PATENT DOCUMENTS

| | | |
|---|---|---|
| CN | 107220581 | 9/2017 |
| CN | 107766839 | 3/2018 |

* cited by examiner

110/120/130/140

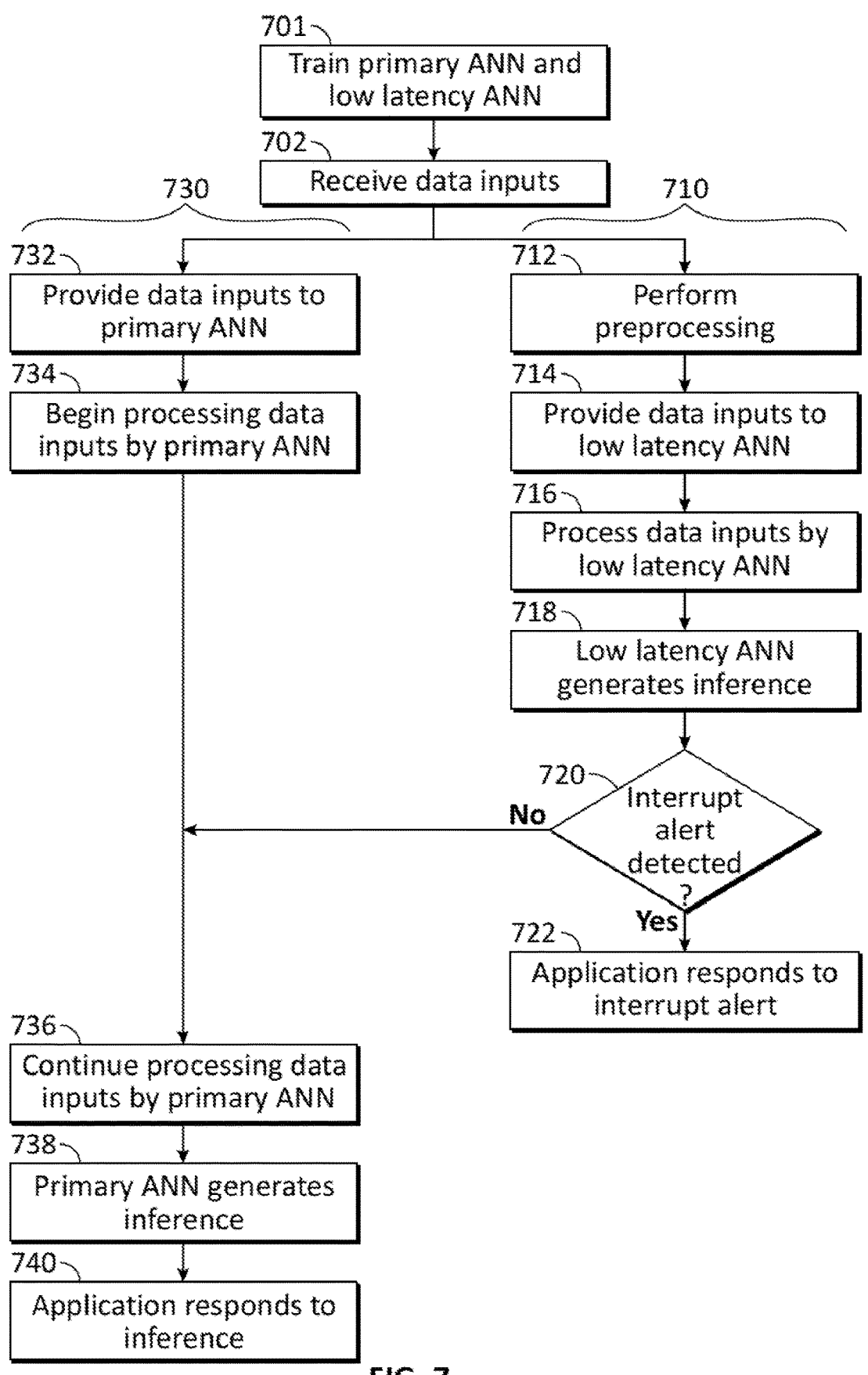

701 — Train primary ANN and low latency ANN

702 — Receive data inputs

730

710

732 — Provide data inputs to primary ANN

734 — Begin processing data inputs by primary ANN

712 — Perform preprocessing

714 — Provide data inputs to low latency ANN

716 — Process data inputs by low latency ANN

718 — Low latency ANN generates inference

720 — Interrupt alert detected?

No

Yes

722 — Application responds to interrupt alert

736 — Continue processing data inputs by primary ANN

738 — Primary ANN generates inference

740 — Application responds to inference

FIG. 7

LOW LATENCY INTERRUPT ALERTS FOR ARTIFICIAL NEURAL NETWORK SYSTEMS AND METHODS IN DATA STREAM PROCESSING

CROSS-REFERENCE TO RELATED APPLICATIONS

This application claims the benefit of U.S. Provisional Patent Application No. 62/640,741 filed Mar. 9, 2018 which is incorporated by reference herein in its entirety.

TECHNICAL FIELD

This disclosure relates generally to artificial neural networks and, more specifically, to such networks with reduced latency.

BACKGROUND

Artificial neural networks (ANNs) are frequently implemented as trainable systems used for performing complex data analysis. ANNs generally include a plurality of nodes (e.g., also referred to as neurons). The nodes are configured to receive data, weight the received data, process the weighted data (e.g., by applying transfer functions, biases, activation functions, thresholding, and/or other processes), and pass the processed data to other nodes. The nodes may be arranged in layers including an input layer that receives data provided to the ANN, hidden layers that perform the majority of the ANN data processing, and an output layer that provides the result (e.g., also referred to as an inference) from the ANN.

In some cases, ANNs are used for sophisticated image analysis, such as performing object characterization (e.g., object recognition) on image data (e.g., video frames or individual images). The resulting inference generated by such ANNs may be a characterization of the data, such as an identification of a particular object that appears in an image.

Unfortunately, in order to perform such analysis, conventional ANNs may include many hidden layers of nodes. Because any of the data inputs may affect the processing of any of the nodes of the hidden layers, the input data (e.g., an entire video frame) generally must be fully processed by all layers of the ANN before an inference is generated. This causes such ANNs to exhibit significant latency from the time that data is received by the input layer until the time that the inference is provided by the output layer. Unfortunately, such latency can be problematic for systems that may need to respond rapidly to various types of inferences.

BRIEF DESCRIPTION OF THE DRAWINGS

FIG. 7 illustrates a process of operating a primary ANN and a low latency ANN in accordance with an embodiment of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
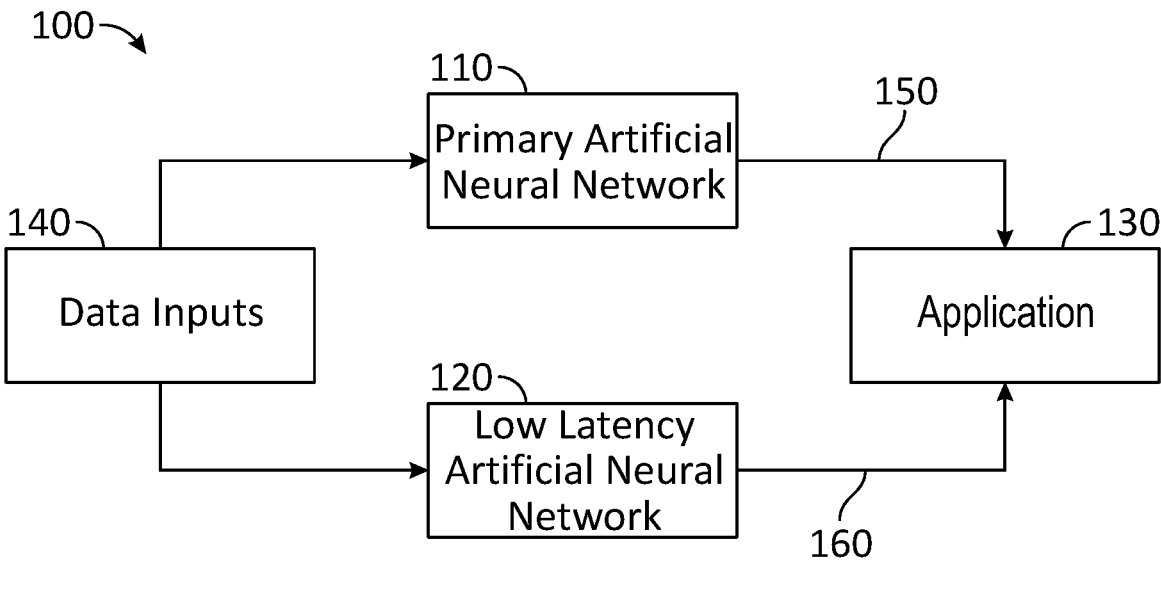
FIG. 1 illustrates a block diagram of a system providing a plurality of artificial neural networks (ANNs) in accordance with an embodiment of the disclosure.

In accordance with embodiments disclosed herein, various systems and methods are provided that utilize a primary artificial neural network (ANN) and a low latency ANN to facilitate different processing needs. For example, FIG. 1 illustrates a block diagram of a system 100 providing a plurality of ANNs in accordance with an embodiment of the disclosure. As shown in FIG. 1, a primary ANN 110 (e.g., a first ANN) and a low latency ANN 120 (e.g., a second ANN) receive data inputs 140 and generate associated inferences 150 and 160, respectively, in response thereto. Inferences 150 and 160 are provided to an application 130 that may selectively adjust its operation in response to inference 150 and/or inference 160.

Significantly, low latency ANN 120 exhibits a reduced latency in comparison to primary ANN 110. In this regard, low latency ANN 120 will generate inference 160 before primary ANN 110 generates inference 150, even if both ANNs 110 and 120 receive data inputs 140 at the same time. As further discussed, such reduced latency may be associated with, for example, fewer layers and/or nodes included in low latency ANN 120, and/or fewer data inputs 140 (e.g., or different data inputs) being processed by low latency ANN 120.

Data inputs 140 may be any type of data that is desired to be analyzed by system 100. Although data inputs 140 and inferences 150 and 160 are generally discussed herein with regard to image data, any appropriate type of data inputs and inferences may be used with the various embodiments provided herein. In some embodiments, both ANNs 110 and 120 may process the same data inputs 140. In other embodiments, low latency ANN 120 may process a reduced number (e.g., a subset) of data inputs 140 in comparison with primary ANN 110. In some embodiments, fewer data inputs 140 may be provided to low latency ANN 120 and/or data inputs 140 may be preprocessed to reduce their number, reduce their resolution (e.g., reduced pixel resolution in the case of image processing), and/or reduce their bit depth (e.g., reduced pixel depth in the case of image processing) before they are processed by low latency ANN 120.

In some embodiments, data inputs 140 may comprise image data such as a data stream of video frames with each frame constituting a set of data inputs 140 to be processed by ANNs 110 and 120. For example, data inputs 140 may be provided by a video file, a realtime video feed, and/or other sources as appropriate. In this example, primary ANN 110 may be configured to perform a characterization analysis on data inputs 140 to generate an inference identifying an object recognized in data inputs 140.

Also in this example, low latency ANN 120 may be configured to perform a less complex analysis on data inputs 140 to generate an inference identifying the occurrence of an event recognized in data inputs 140. In this regard, the analysis performed by low latency ANN 120 may be less sophisticated that performed by primary ANN 110 (e.g., due to the reduced processing performed by low latency ANN 120). For example, the detection of an event (e.g., the sudden appearance of an object in a scene of a video image) provided by an example inference 160 of low latency ANN 120 may require less processing than a further characterization of the event (e.g., the recognition of the type of object appearing in a scene of a video image) provided by an example inference 150 of primary ANN 110.

For example, the inference 160 provided by low latency ANN 120 may correspond to the detection of an event that requires rapid response by application 130 (e.g., a sudden change in an imaged video scene, the appearance of a new object in the scene, and/or other events). If inference 160 is associated with such a high priority event, it may be identified by low latency ANN 120 and/or application 130 as an interrupt alert that triggers application 130 to adjust its operation. Such interrupt alerts may constitute a higher priority for application 130 than a complex characterization provided by the inference 150 from primary ANN 110. For example, in the case of video image processing, if low latency ANN 120 detects the sudden appearance of an object, it may be preferable for application 130 to perform one or more rapid actions (e.g., instructing a guidance system of a vehicle that includes system 100 to maneuver the vehicle to avoid hitting the detected object) in response to the inference 160 (e.g., an interrupt alert in this case) rather than waiting for an additional time period to pass until primary ANN 110 performs a more specific identification of the particular type of object and finally provides inference 150.

Figure 2:
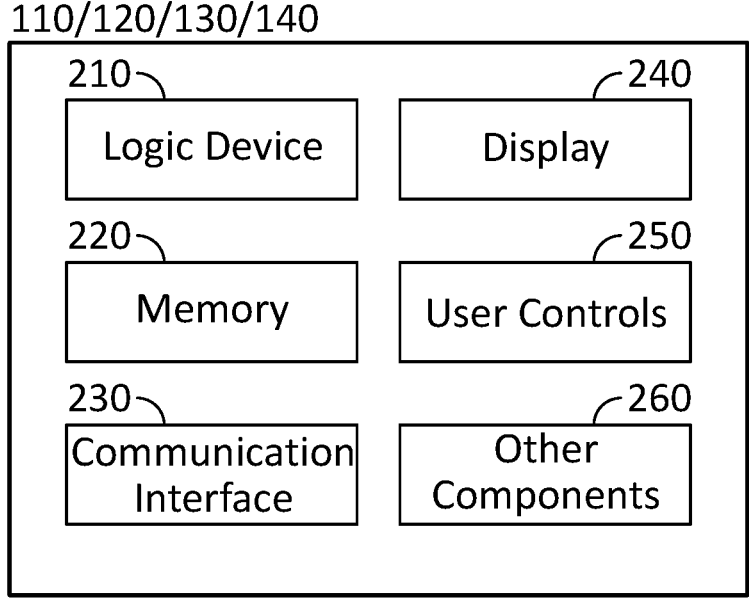
FIG. 2 illustrates a block diagram of an example hardware implementation in accordance with an embodiment of the disclosure.

The various features of system 100 may be implemented in appropriate hardware. For example, FIG. 2 illustrates a block diagram of an example hardware implementation that may be used to provide one or more of primary ANN 110, low latency ANN 120, application 130, and data inputs 140 in accordance with an embodiment of the disclosure. As shown, the implementation illustrated in FIG. 2 provides a hardware system including a logic device 210, a memory 220, a communication interface 230, a display 240, user controls 250, and other components 260.

Logic device 210 may be implemented as any appropriate device used for data processing such as a processor (e.g., a microprocessor, a single-core processor, and/or a multi-core processor), a microcontroller, a programmable logic device (PLD) (e.g., a field programmable gate array (FPGA), a complex programmable logic device (CPLD), a field programmable system on a chip (FPSC), or other types of programmable devices), a graphics processing unit (GPU), and/or other devices. Memory 220 may be implemented by one or more memory devices providing machine readable mediums such as volatile memory (e.g., random access memory), non-volatile non-transitory memory (e.g., read-only memory, electrically-erasable read-only memory, flash memory), or other types of memory. In various embodiments, memory 220 may store software instructions to be executed by logic device 120 (e.g., or used to configure logic device 120) in accordance with the various operations discussed herein, data corresponding to data inputs 140, data corresponding to inferences 150 and 160, and/or other information as appropriate.

Communication interface 230 may be implemented with appropriate hardware to provide wired and/or wireless data communication between the various components of system 100 and/or between system 100 and other devices. For example, in some embodiments, communication interface 230 may be a network interface (e.g., an Ethernet interface, a Wi-Fi interface, and/or others), a serial interface, a parallel interface, and/or other types as appropriate. For example, one or more communication interfaces 230 may be provided to receive data inputs 140 from external devices (e.g., from networked cameras or file systems), pass communications among the various components of system 100, and/or provide data outputs to external devices.

Display 140 may be implemented with appropriate hardware to present information to a user of system 100. For example, in some embodiments, display 140 may be implemented by a screen, touchscreen, and/or other appropriate hardware. User controls 250 may be implemented with appropriate hardware to permit a user to interact with and/or operate system 100. For example, in some embodiments, user controls may be implemented by various components such as a keyboard, mouse, trackpad, touchscreen (e.g., in some cases integrated with display 140), buttons, slide bars, knobs, and/or other appropriate hardware. Other components 260 may be provided to implement any additional hardware features as appropriate for particular implementations.

Figure 3:
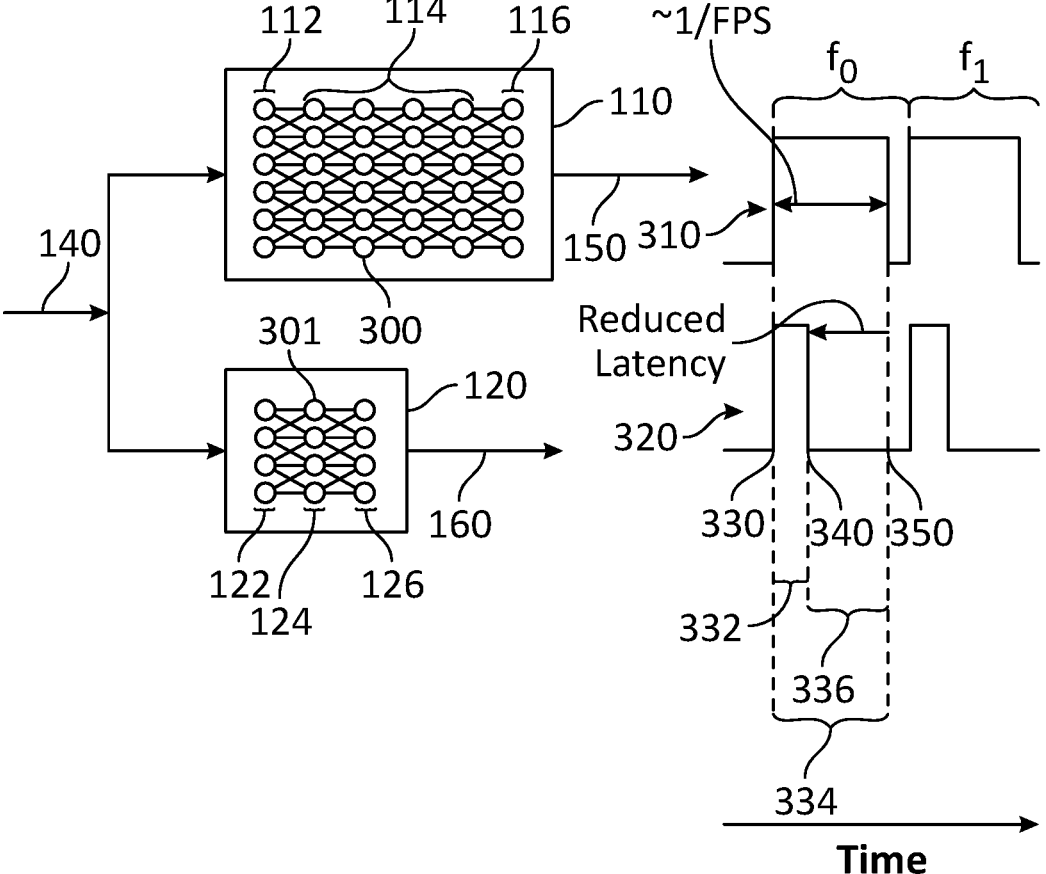
FIG. 3 illustrates a block diagram of a primary ANN, a low latency ANN, and associated timing diagrams in accordance with an embodiment of the disclosure.

FIG. 3 illustrates a block diagram of primary ANN 110, low latency ANN 120, and associated timing diagrams 310 and 320 in accordance with an embodiment of the disclosure. As previously discussed, primary ANN 110 and low latency ANN 120 receive data inputs 140 and provide inferences 150 and 160 in response thereto.

As shown, primary ANN 110 includes various nodes 300 arranged in multiple layers including an input layer 112, hidden layers 114, and an output layer 116. Low latency ANN 120 includes various nodes 301 arranged in multiple layers including an input layer 122, hidden layers 124, and an output layer 126. However, low latency ANN 120 may include a reduced number of hidden layers 124 and also a reduced number of nodes 301 in input layer 122, hidden layers 124, and output layer 126 in comparison with primary ANN 110. The processing associated with nodes 301 of low latency ANN 120 may be reduced in comparison with nodes 300 of primary ANN 110. For example, in some embodiments, nodes 301 of low latency ANN 120 may be implemented with binary weights (e.g., low latency ANN 120 may be implemented as a binary ANN and/or a ternary ANN), while nodes 300 of primary ANN 110 may be implemented with non-binary weights.

Although particular numbers of hidden layers 114 and 124 are shown, any desired number of hidden layers may be provided in various embodiments. Also, although particular numbers of nodes 300/301 are shown in layers 112, 114, 116, 122, 124, and 126, any desired number of nodes 300/301 may be provided in various embodiments.

In some embodiments, primary ANN 110 and low latency ANN 120 may be implemented to run in parallel on separate hardware devices that differ in complexity and/or processing capability to accommodate the different processing features of ANNs 110 and 120. For example, in some embodiments, primary ANN 110 may be implemented in a high performance logic device (e.g., a GPU or other processor), while low latency ANN 120 may be implemented in a low power logic device (e.g., a PLD). In other embodiments, primary ANN 110 and low latency ANN 120 may be implemented to run on the same logic device sequentially (e.g., using a single processing core) or in parallel (e.g., using multiple processing cores). In various embodiments, application 130 may run on the same logic device as one or both of primary ANN 110 and low latency ANN 120, or on a separate logic device.

In the case of primary ANN 110, the full number of data inputs 140 are processed through all of layers 112, 114, and 116 before inference 150 is provided. In the case of low latency ANN 110, a reduced number of data inputs 140 may be processed through all of layers 122, 124, and 126 before inference 160 is provided. However, primary ANN 110 is implemented with a larger number of nodes 300 than the number of nodes 301 of low latency ANN 120 (e.g., due to a larger number of hidden layers 114 than hidden layers 124 and/or a larger number of nodes 300 than nodes 301). As a result, primary ANN 110 will exhibit greater latency than low latency ANN 120. Accordingly, inference 160 will be generated by low latency ANN 120 before inference 150 is generated by primary ANN 110.

These different latencies are further illustrated in timing diagrams 310 and 320 associated with primary ANN 110 and low latency ANN 120, respectively. In the case of timing diagrams 310 and 320, data inputs 140 correspond to a data stream of a plurality of video frames. In this regard, a first video frame f0 may be provided as data inputs 140 to primary ANN 110 and low latency ANN 120 at a time 330.

In response to the received data inputs 140, low latency ANN 120 processes video frame f0 during time period 332 lasting from time 330 until time 340 when inference 160 is generated. Also in response to the received data inputs 140, primary ANN 110 processes video frame f0 during time period 334 lasting from time 330 until time 350 when inference 150 is generated.

As shown, low latency ANN 120 exhibits a latency extending from time 330 to time 340 corresponding to time period 332. Primary ANN 110 exhibits a latency extending from time 330 to time 350 corresponding to time period 334. Thus, it will be appreciated that low latency ANN 120 and primary ANN 110 exhibit a latency difference corresponding to time period 336 lasting from time 340 to time 350). As a result, inference 160 will can be made available to application 130 much sooner than inference 150.

As discussed, application 130 may selectively adjust its operation in response to inference 150 and/or inference 160. Advantageously, by implementing low latency ANN 120 with reduced latency in comparison to primary ANN 110, application 130 will rapidly receive any inferences 160 corresponding to interrupt alerts and may adjust its operation in response thereto without having to wait for primary ANN 110 to generate its inference 150.

As further shown in FIG. 3, successive video frames (e.g., video frame f0 followed by video frame f1, and so on) may be provided and processed by ANNs 110 and 120. Moreover, because of the substantially reduced latency provided by low latency ANN 120, application 130 may adjust its operation in response to an interrupt alert during the processing of the current video frame (e.g., f0) and even before the next video frame (e.g., f1) is received at data inputs 140 in some embodiments.

Figure 4:
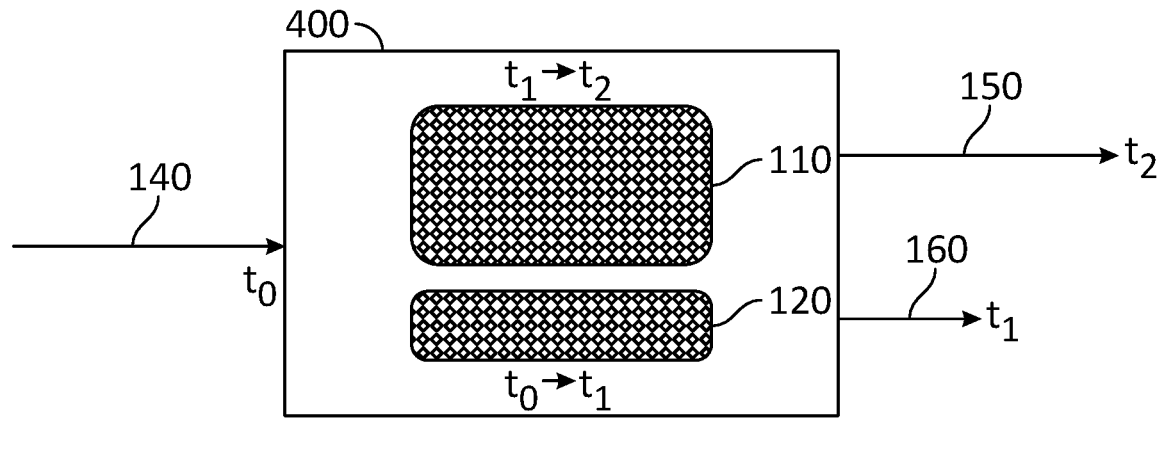
FIG. 4 illustrates a block diagram of a primary ANN and a low latency ANN in sequential operation in accordance with an embodiment of the disclosure.

Various configurations are contemplated for primary ANN 110 and low latency ANN 120. For example, FIG. 4 illustrates a block diagram of primary ANN 110 and low latency ANN 120 in sequential operation in accordance with an embodiment of the disclosure. In FIG. 4, primary ANN 110 and low latency ANN 120 are implemented on a shared logic device 400 and are configured for sequential operation as discussed. In this regard, after data inputs 140 are received at time t0, low latency ANN 120 begins processing data inputs 140 and provides inference 160 at time t1 (e.g., exhibiting a latency from time t0 to time t1). Primary ANN 110 receives and begins processing data inputs 140 at time t1, and provides inference 150 at time t2 (e.g., exhibiting a latency from time t1 to time t2). Thus, in the sequential processing embodiment shown in FIG. 4, inference 160 arrives earlier at time t1, and inference 150 arrives later at time t2.

Figure 5:
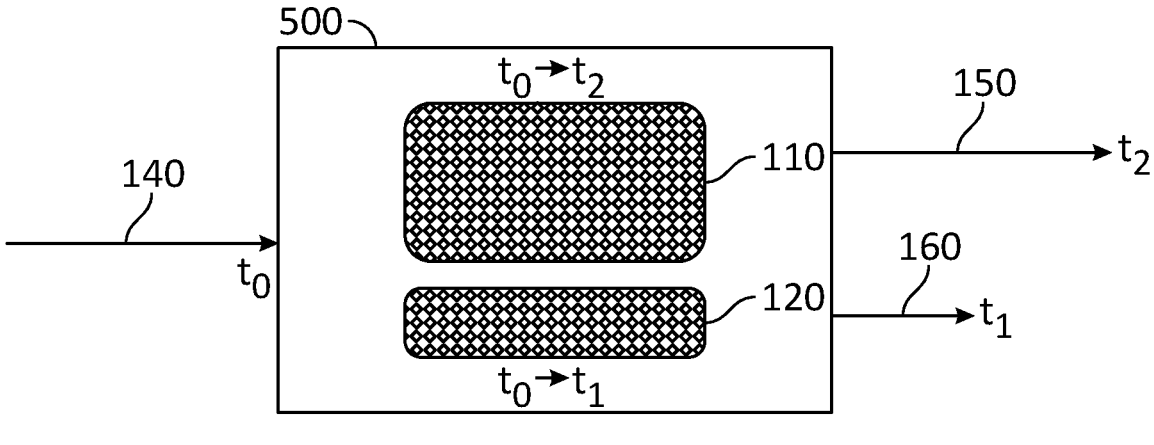
FIG. 5 illustrates a block diagram of a primary ANN and a low latency ANN in parallel operation in accordance with an embodiment of the disclosure.

FIG. 5 illustrates a block diagram of primary ANN 110 and low latency ANN 120 in parallel operation in accordance with an embodiment of the disclosure. In FIG. 5, primary ANN 110 and low latency ANN 120 operate in parallel and may be implemented on a shared logic device 500 (e.g., with different processor cores associated with each of ANNs 110and 120) and/or on separate logic devices as discussed. In FIG. 5, primary ANN 110 and low latency ANN both receive data inputs 140 at time t0 and begin processing. Low latency ANN 120 provides inference 160 at time t1, and primary ANN 110 subsequently provides inference 150 at time t2 due to its longer latency.

Figure 6:
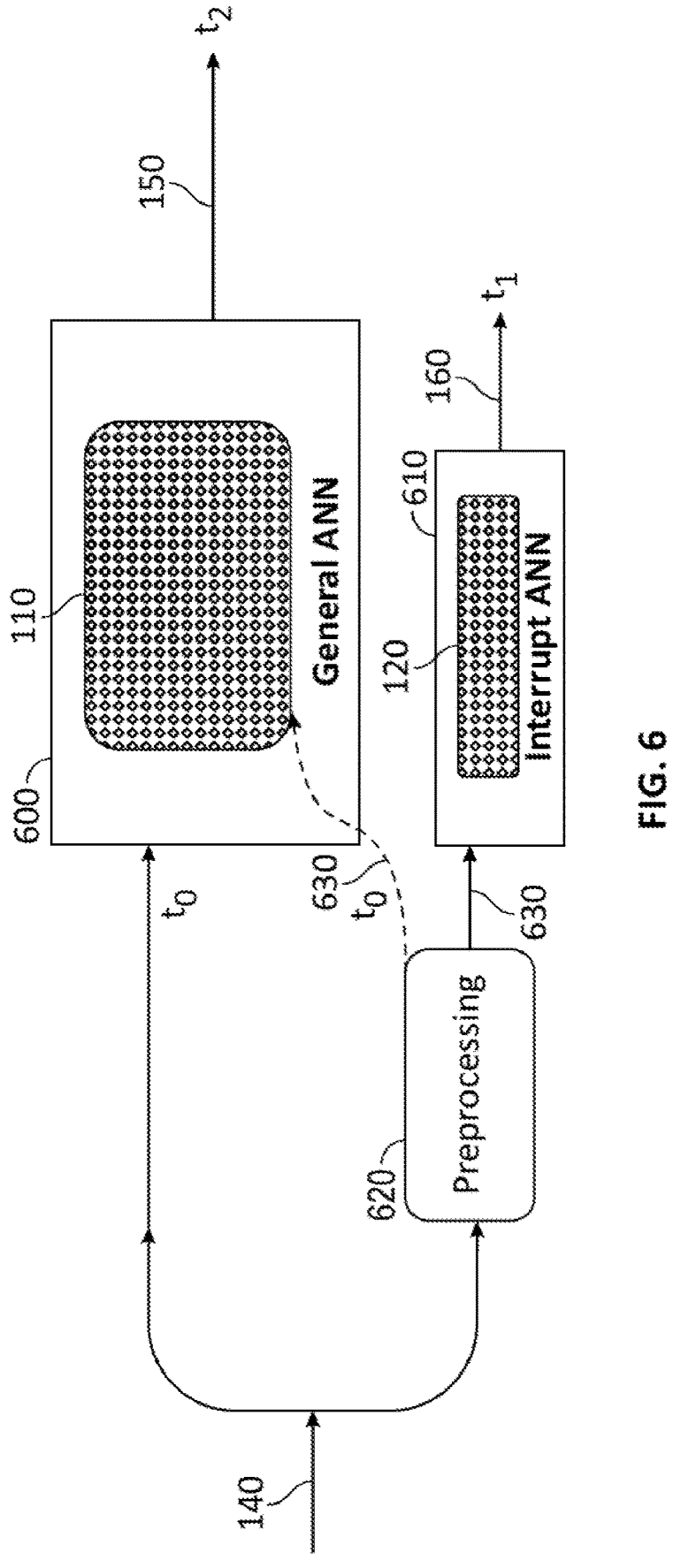
FIG. 6 illustrates a block diagram of a primary ANN and a low latency ANN with a preprocessing operation in accordance with an embodiment of the disclosure.

FIG. 6 illustrates a block diagram of primary ANN 110 and low latency ANN 120 implemented with a preprocessing operation in accordance with an embodiment of the disclosure. As discussed, in some embodiments, data inputs 140 may be preprocessed before they are provided to low latency ANN 120. For example, data inputs 140 may be preprocessed to reduce their number, reduce their resolution, reduce their bit depth, and/or otherwise modified as appropriate to provide processed data inputs 630 to be further processed by low latency ANN 120.

In FIG. 6, primary ANN 110 is implemented by logic device 600 and low latency ANN 120 is implemented by logic device 610. In addition, a preprocessing operation is performed by a logic device 620. Although various logic devices 600, 610, and 620 are shown, any desired number of shared and/or separate logic devices may be used to implement the various features of FIG. 6 as appropriate.

As shown, data inputs 140 are initially provided to logic device 620 which preprocesses them to provide processed data inputs 630 for use by low latency ANN 120 as discussed. In some embodiments, as shown, processed data inputs 630 may also be provided to primary ANN 110 for processing if desired.

In some embodiments, the preprocessing operation of logic device 620 may be performed prior to the processing performed by primary ANN 110 such that data inputs 140 and processed data inputs 630 are provided to primary ANN 110 and low latency ANN 120, respectively, at time to. Low latency ANN 120 may then process data inputs 630 to provide inference 160 at time t1, and primary ANN 110 may process data inputs 630 to provide inference 150 at a later time t2 as discussed for various embodiments. In other embodiments, data inputs 140 may be provided to primary ANN 110 and the preprocessing operation of logic device 620 at the same time such that primary ANN 110 may begin processing data inputs 140 while the preprocessing operation is performed by logic device 620.

FIG. 7 illustrates a process of operating primary ANN 110 and low latency ANN 120 in accordance with an embodiment of the disclosure. In block 701, primary ANN 110 and low latency ANN 120 are trained on appropriate data sets. In this regard, known data sets may be provided as data inputs 140 to primary ANN 110 and low latency ANN 120. The weights, transfer functions, and other processing associated with their various nodes 300/301 may be adjusted in an iterative manner (e.g., through appropriate feedback, back-propagation, and/or other techniques) until primary ANN 110 and low latency ANN 120 generate appropriate inferences 150 and 160. For example, in some embodiments where video frames are to be analyzed, primary ANN 110 may be trained on a data set comprising video frames with full resolution and full bit depth, and low latency ANN 120 may be trained on a data set comprising video frames with reduced resolution and reduced bit depth (e.g., preprocessed versions of the video frames provided to primary ANN 110 as shown in FIG. 6). After training is completed, primary ANN 110 and low latency ANN 120 may begin normal operation. Accordingly, in block 702, system 100 receives data inputs 140, such as video frames to be analyzed by primary ANN 110 and low latency ANN 120.

As discussed, in various embodiments, primary ANN 110 and low latency ANN 120 may operate in a parallel or sequential manner. In FIG. 7, parallel operation is illustrated with blocks of group 710 generally associated with low latency ANN 120, and blocks of group 730 generally associated with primary ANN 110. However, sequential operation may also be provided with some of all blocks of group 710 being performed prior to blocks of group 730.

Figure 8:
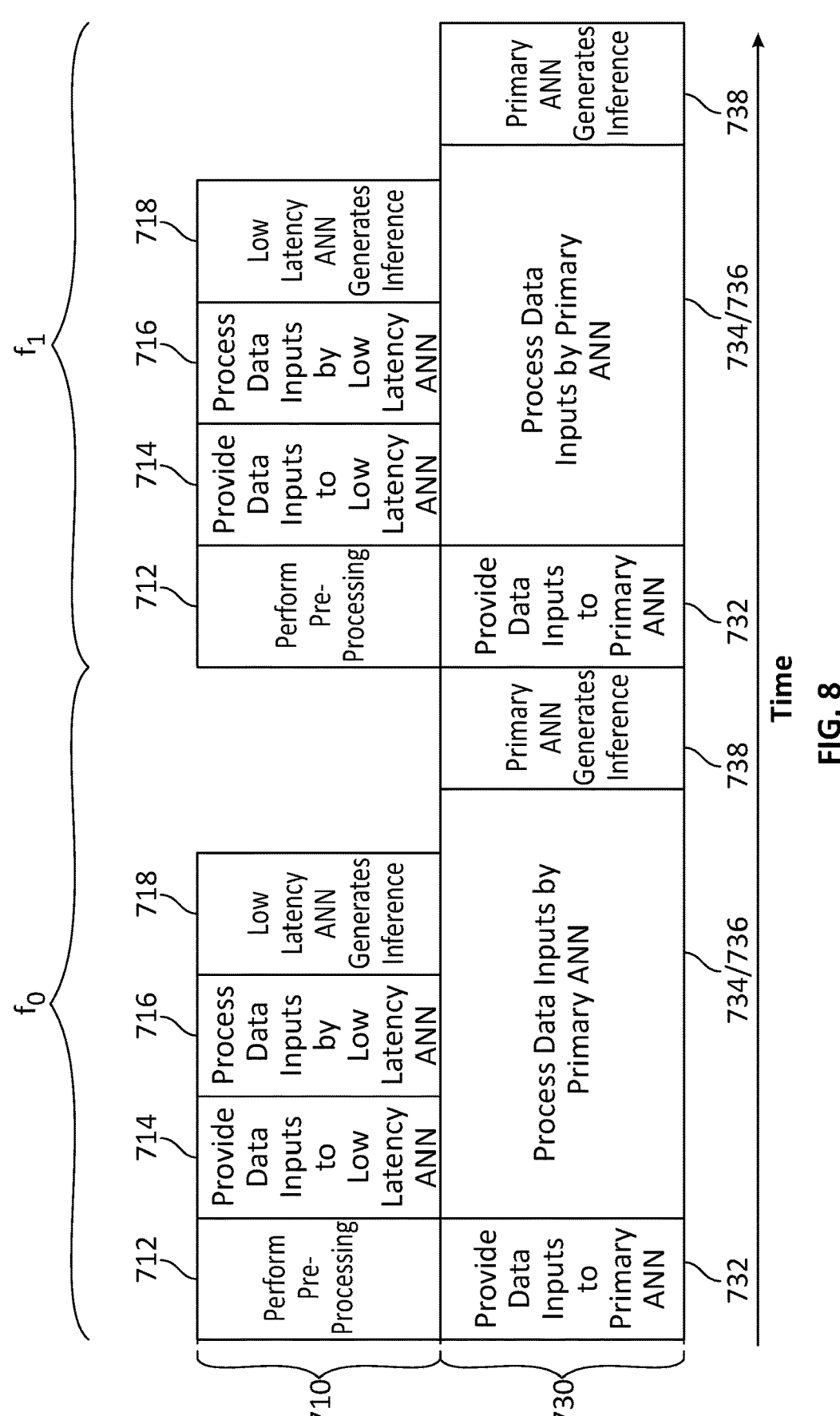
FIG. 8 illustrates additional timing diagrams for a primary ANN and a low latency ANN in accordance with an embodiment of the disclosure.

FIG. 8 illustrates additional timing diagrams for various operations of groups 710 and 730 associated with primary ANN 110 and low latency ANN 120 in accordance with an embodiment of the disclosure. In particular, FIG. 8 illustrates operations associated with the analysis of sequential video frames f0 and f1 received in a data stream provided to data inputs 140.

Referring to the blocks of group 710, in block 712, preprocessing is optionally performed on data inputs 140 to generate processed data inputs 630. In block 714, data inputs 140 (or processed data inputs 630) are provided to and received by low latency ANN 120. In block 716, low latency ANN 120 processes data inputs 140/630. In block 718, low latency ANN 120 generates inference 160 and provides it to application 130.

As discussed, in some cases, low latency ANN 120 and/or application 130 may identify inference 160 as an interrupt alert that triggers application 130 to adjust its operation as discussed. Accordingly, in block 720, if low latency ANN 120 and/or application 130 determines that inference 160 is associated with an interrupt alert, then the process continues to block 722. Otherwise, the process continues to block 736 as shown where primary ANN 110 continues its processing.

In block 722, application 130 adjusts its operation in response to the interrupt alert. In some embodiments, application 130 may have no need to receive the additional inference 150 subsequently provided by primary ANN 120 and may therefore ignore inference 150 when it is eventually generated. In other embodiments, application 130 may utilize inference 150 in further processing.

Referring now to the blocks of group 730, in block 732, data inputs 140 are provided to and received by primary ANN 110. As shown, in some embodiments, primary ANN 110 may receive data inputs 140 while preprocessing block 712 is performed such that primary ANN 110 is not required to wait before beginning to process data inputs 140 In block 734, primary ANN 110 begins processing data inputs 140. In this regard, as previously discussed, low latency ANN 120 may provide inference 160 (block 718) before primary ANN 110 provides inference 150 as illustrated in both FIGS. 7 and

8. Accordingly, primary ANN 110 may continue to process data inputs 140 in block 736 even after the blocks of group 710 have completed.

In block 738, primary ANN 110 generates inference 150 and provides it to application 130. In block 740, application 130 adjusts its operation in response to inference 150.

Blocks 702 through 740 may be repeated for additional data inputs, such as for additional video frame f1 as shown in FIG. 8. Accordingly, system 100 may continue to process a data stream providing new sets of data inputs 140 as desired, such as for processing video data.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:

receiving a first plurality of data inputs at a first artificial neural network (ANN) and a second plurality of data inputs at a second ANN, wherein the first data inputs and the second data inputs are associated with a data stream comprising image data;

processing the first data inputs by the first ANN to perform a characterization analysis on the first data inputs to generate a first inference output after a first latency, wherein the first inference output comprises a characterization that identifies a type of object in the image data;

processing the second data inputs by the second ANN to perform a detection analysis on the second data inputs independently of the first ANN to generate a second inference output after a second latency, wherein the second inference output comprises a detection of an occurrence of an event comprising a sudden appearance of the object in the image data, wherein the second latency is less than the first latency as a result of the first ANN comprising a greater number of hidden layers and a greater number of nodes than the second ANN, wherein the second inference output comprises an interrupt alert associated with the event;

providing the second inference output to a logic device before the first inference output is generated;

triggering an application implemented on the logic device to adjust operation of the application in response to the interrupt alert before the first inference output is generated to permit the operation of the application to be adjusted without waiting for the characterization to be provided by the first ANN and cause the application to exhibit a reduced response time to the image data; and wherein the processing the first data inputs by the first ANN and the processing the second data inputs by the second ANN are performed simultaneously in parallel with each other during overlapping time periods at least until the second inference output is generated.

2. The method of claim 1, further comprising preprocessing the first data inputs to generate the second data inputs.

3. The method of claim 2, wherein:

the first data inputs comprise a video frame of the data stream;

the second data inputs comprise a reduced resolution video frame; and the preprocessing comprises processing the video frame of the data stream to generate the reduced resolution video frame.

4. The method of claim 1, further comprising:

training the first ANN with a first set of video frames;

training the second ANN with a second set of video frames generated from the first set; and wherein the second set has a reduced pixel resolution and/or a reduced pixel depth in relation to the first set.

5. The method of claim 1, wherein:

the first set of data inputs is greater than the second set of data inputs.

6. The method of claim 5, wherein the hidden layers of the second ANN comprise nodes utilizing binary weights.

7. The method of claim 1, wherein:

the first ANN is implemented by a graphics processing unit (GPU); and the second ANN is implemented by a programmable logic device (PLD) that uses less power than the GPU.

8. The method of claim 1, further comprising ignoring, by the application, the first inference output in response to the interrupt alert.

9. The method of claim 1, wherein the interrupt alert provided by the second ANN constitutes a higher priority for the application than the characterization provided by the first ANN.

10. The method of claim 9, wherein the adjusted operation of the application comprises instructing a guidance system of a vehicle.

11. A system comprising:

a first artificial neural network (ANN) configured to:

receive a first plurality of data inputs associated with a data stream comprising image data, and process the first data inputs to perform a characterization analysis on the first data inputs to generate a first inference output after a first latency, wherein the first inference output comprises a characterization that identifies a type of object in the image data;

a second ANN configured to:

receive a second plurality of data inputs associated with the data stream, and process the second data inputs to perform a detection analysis on the second data inputs independently of the first ANN to generate a second inference output after a second latency, wherein the second inference output comprises a detection of an occurrence of an event comprising a sudden appearance of the object in the image data, wherein the second latency is less than the first latency as a result of the first ANN comprising a greater number of hidden layers and a greater number of nodes than the second ANN, wherein the second inference output comprises an interrupt alert associated with the event;

a logic device configured to receive the second inference output before the first inference output is generated, wherein an application implemented by the logic device is configured to be triggered to adjust operation of the application in response to the interrupt alert before the first inference output is generated to permit the operation of the application to be adjusted without waiting for the characterization to be provided by the first ANN and cause the application to exhibit a reduced response time to the image data; and wherein the process performed by the first ANN and the process performed by the second ANN are performed simultaneously in parallel with each other during overlapping time periods at least until the second inference output is generated.

12. The system of claim 11, wherein the second data inputs are generated from the first data inputs.

13. The system of claim 12, wherein:

the first data inputs comprise a video frame of the data stream; and the second data inputs comprise a reduced resolution video frame.

14. The system of claim 11, wherein:

the first ANN is configured to be trained with a first set of video frames;

the second ANN is configured to be trained with a second set of video frames generated from the first set; and the second set has a reduced pixel resolution and/or a reduced pixel depth in relation to the first set.

15. The system of claim 11, wherein:

the first set of data inputs is greater than the second set of data inputs.

16. The system of claim 15, wherein the hidden layers of the second ANN comprise nodes utilizing binary weights.

17. The system of claim 11, wherein:

the first ANN is implemented by a graphics processing unit (GPU); and the second ANN is implemented by a programmable logic device (PLD) that uses less power than the GPU.

18. The system of claim 11, wherein the application is configured to ignore the first inference output in response to the interrupt alert.

19. The system of claim 11, wherein the interrupt alert provided by the second ANN constitutes a higher priority for the application than the characterization provided by the first ANN.

20. The system of claim 19, wherein the adjusted operation of the application comprises an instruction to a guidance system of a vehicle.

\* \* \* \* \*